Dec. 1, 1964 J. BOCHAN 3,159,257
SPEED RESPONSIVE WITH VARIABLE MEANS
Filed Dec. 13, 1962

INVENTOR.
JOHN BOCHAN
BY Derek P Lawrence
HIS ATTORNEY

United States Patent Office 3,159,257
Patented Dec. 1, 1964

3,159,257
SPEED RESPONSIVE CLUTCH WITH
VARIABLE MEANS
John Bochan, Louisville, Ky., assignor to General Electric
Company, a corporation of New York
Filed Dec. 13, 1962, Ser. No. 244,491
6 Claims. (Cl. 192—104)

This invention relates to clutches, and more particularly to multi-speed clutches of the type which are centrifugally controlled.

It is an object of my invention to provide a new and improved multi-speed clutch wherein use is made of centrifugal force in order to obtain different speeds.

A further more specific object of my invention is to provide such a clutch wherein the centrifugally responsive members are mounted on the driven member of the clutch.

Yet a further specific object of my invention is the provision of an improved actuating system for such a clutch, which will permit easy actuation in response to operation of a control member without any danger that the rotation of the clutch will accidentally cause such actuation.

In carrying out my invention in one form thereof, I provide a clutch which has, coaxially mounted, an input drum and a driven output member. On the driven member, clutching means are movably mounted so as to have a clutching surface engageable with the drum. The clutching surface engages the drum; this effects a drive from the drum to the driven member through the clutching means.

The clutching means is mounted on the driven member so that at least part of its mass is acted on by centrifugal force in opposition to the spring means. As a result, the spring means is overcome at a predetermined speed, and the clutch will not accelerate any further. The net amount of mass in the clutching means which is so acted on by centrifugal force is selectively variable; by so varying this mass, the speed at which the force of the spring means is overcome may be varied and different output speeds may be obtained from the clutch.

The subject matter which I regard as my invention is particularly pointed out and distinctly claimed in the concluding portion of the specification. My invention, however, both as to organization and method of operation, together with further objects and adavantages thereof, may best be understood by reference to the following description taken in conjunction with the accompanying drawing.

Figure 1:
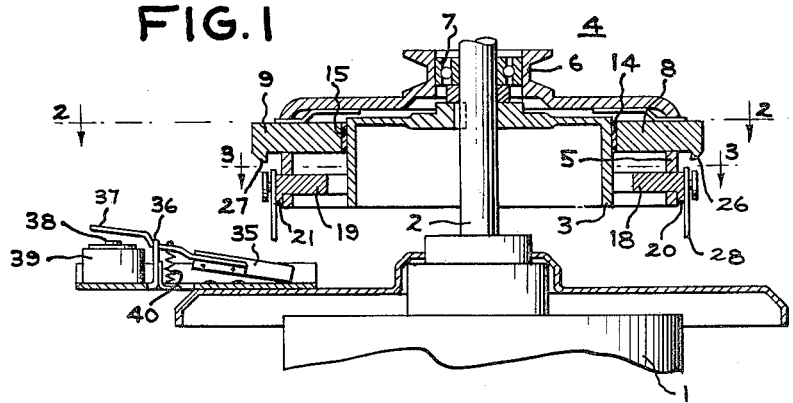
FIGURE 1 is a fragmentary side elevational view showing my improved clutch, the mechanism being shown in section to illustrate details.
Figure 2:
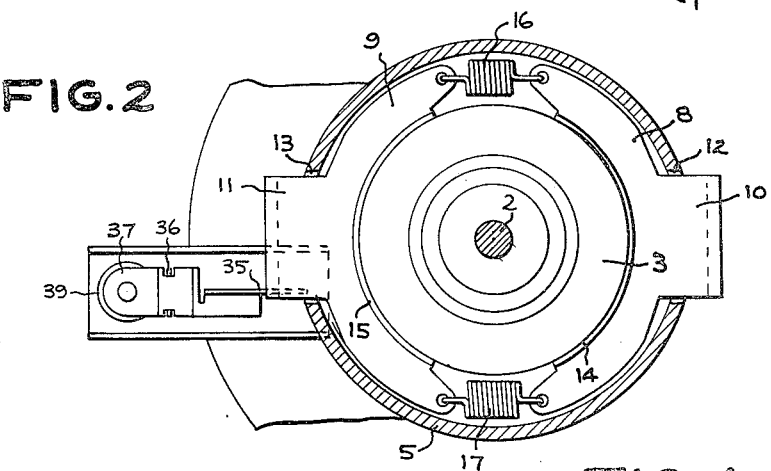
FIGURE 2 is a view along line 2—2 in FIGURE 1.
Figure 3:
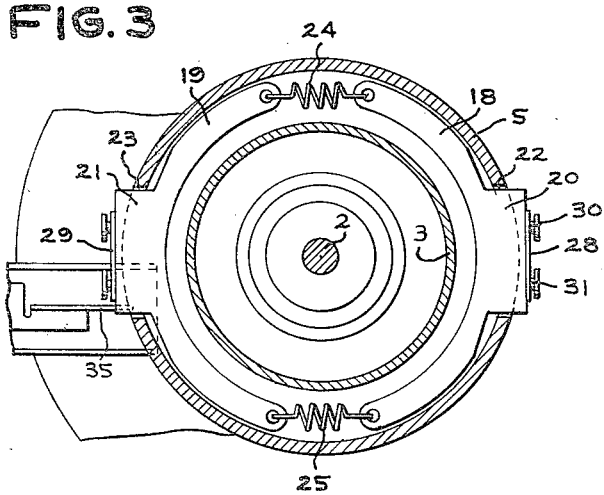
FIGURE 3 is a view taken along line 3—3 in FIGURE 1.

Referring now to FIGURES 1, 2 and 3, there is shown part of a suitable drive source, such as a motor 1, which has an output shaft 2 to which is secured the driving drum member 3 of a clutch generally indicated at 4. Positioned around drum 3 is a second drum 5 which comprises the driven or output member of the clutch. Output drum 5 may conventionally include an output pulley 6 as an integral part thereof, and is coaxially mounted with driving drum 3. This is effected through a ball bearing mount 7 by means of which the drum 5 is rotatably secured on shaft 2 so that it can rotate relative to the shaft.

As best shown in FIGURE 2, output drum 5 carries clutching means in the form of a pair of speed responsive or centrifugally operated clutch shoes 8 and 9. Shoes 8 and 9 comprise curved members which are positioned between drums 3 and 5 and include respectively outwardly extending tabs 10 and 11 which fit into slots 12 and 13 in the wall of the outer drum. The engagement between tabs 10 and 11 and their respective slots serves not only to mount shoes 8 and 9 on driven member 5, but also to provide a positive driving connection so that the shoes may drive the drum 5. The fit between the tabs and mounting slots 12 and 13 is, however, loose enough so that the shoes may slide radially inwardly and outwardly with respect to the outer drum. Shoes 8 and 9 are provided respectively with inner friction surfaces 14 and 15, and are normally biased toward each other by means of tension springs 16 and 17 connected between them so that the friction surfaces engage driving drum 3. In other words, when the driving drum is at rest, it is contacted by shoes 8 and 9 under the biasing force of springs 16 and 17. As a result, when the inner drum is driven it will, through shoes 8 and 9, drive the outer drum 5.

As the output drum 5 accelerates, the centrifugal force created by its rotation begins to reduce the pressure with which the clutch shoes 8 and 9 engage inner drum 3. In other words, the mass of the shoes responds to centrifugal force to act against springs 16 and 17, and this opposition to the biasing force of the springs causes the pressure with which the shoes 8 and 9 engage drum 3 to become less.

Thus, the higher the speed of driven member 5, the smaller is the pressure between the clutch shoes and the driving drum 3, and the smaller is the torque which can be transmitted to the driven member 5. The shoes, in fact, begin to slip with regard to the inner drum if the speed is increased beyond a certain point, i.e., the shoes are ineffective to increase the speed of the output drum 5 and the load to which it is connected (not shown) any further. In other words, the structure provides the torque necessary to keep output member 5 rotating at a constant speed regardless of the input speed, provided the input speed is sufficiently high to cause this effect to take place below the driving speed of motor 1.

It will readily be seen from the foregoing that a structure for providing a substantially constant output speed is provided. It will further be seen that the speed at which the slippage between shoes 8 and 9 and inner drum 3 becomes sufficient to prevent further speed increases is dependent upon the mass of shoes 8 and 9 which opposes the biasing force of springs 16 and 17.

I propose, by means of my improved structure, to selectively vary the mass of the shoes which acts in opposition to the biasing force of the springs, and thereby effectively vary the output speed of the clutch. In order to achieve this effect, I provide a pair of auxiliary weights 18 and 19 which can best be seen by viewing FIGURE 3 in conjunction with FIGURE 1. Weights 18 and 19 are secured on driven member 5 by the same approach used for shoes 8 and 9. In other words, the weights are respectively provided with tabs 20 and 21 which extend through slots 22 and 23 in member 5 so as to permit the weights to be radially movable. The weights are biased toward each other by a pair of springs 24 and 25 which are, preferably, very weak so that they exert enough force to bias the weights toward each other to the position shown in FIGURES 1 and 3, but are overcome by centrifugal force at a very low speed, almost as soon as rotation starts.

Figure 4:
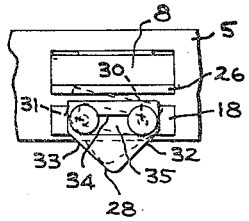
FIGURE 4 is an enlarged fragmentary elevational view showing the improved actuation means for the clutch of FIGURES 1, 2 and 3.

Weights 18 and 19 are aligned with shoes 8 and 9 and are directly beneath them. In order to permit connection of weights 18 and 19 to shoes 8 and 9, the shoes are respectively provided with downwardly extending tabs 26 and 27 adjacent their outer peripheries, and the weight members are respectively provided with like movable latching members 28 and 29. Referring to FIGURE 4, the structure and operation of these latching members may be more readily understood. It will be observed that the latching member 28 is secured by two pins 30 and 31 to the outer surface of tab 20. The pins are preferably located in a plane substantially perpendicular to the axis of rotation of drums 3 and 5; in the present case, with the axis being vertical as shown in FIGURE 1, the plane of the pins is horizontal. The bottom portion of the latch member is substantially V-shaped, with slanting sides 32 and 33, and the latch member seats itself by gravity in the position shown in solid outline by the engagement of the top part 34 thereof on the pins 30 and 31.

The open interior portion 35 of latch member 28 is sufficiently large that when the latch member is raised to the position shown in broken outline it will, unless held there, drop back down to the position shown in solid outline. The mass of the latch member 28 is such that its center of gravity falls close to the line drawn between the two pins 30 and 31. As a result, even during high speed rotation of the member 5 there is little or no force resulting from the rotation itself to make the latch member move to the position shown in broken lines. Rather, an external force is required for this to occur. This is in distinction to what would occur with a simple pendulum type of latch member adapted to be engaged from below; in such a case, not only would engagement from below tend to make it move to its cocked position (in broken outline), but also centrifugal force would, at a certain speed, make it tend to move out to such a position.

In its cocked position, latch member 28 has been pivoted about one of the pins so as to have a portion which is in interfering relationship with the downwardly extending flange 26 on shoe 8. As a result, if the latch member 28 is moved to its cocked position when rotation starts, it will very shortly thereafter, when centrifugal force overcomes springs 24 and 25, move out against the inner surface of flange 26 and become wedged there. The result of this is that the centrifugal force which acts on weight 18 is transmitted directly to shoe 8 so that it acts thereon also. In other words, the mass of weight 18 has been added to shoe 8 so as to change the effective mass which acts, in response to centrifugal force, in opposition to springs 16 and 17.

Latches 28 and 29 are moved to their cocked positions by any suitable means. In the present structure, this takes the form of a member 35 pivotally mounted at 36 and having an end 37 formed of magnetic material so as to be attracted to an iron core 38 when a coil 39 is energized. A spring 40 may be provided to cause member 35 normally to be in the position shown, and to rise into an operating position only upon energization of coil 39.

When coil 39 is energized, member 35 rises, and as a result is in the path of the lower portions of latches 28 and 29 in their uncocked positions. For a predetermined direction of rotation it will strike the latches on side 32 thereof, pivoting them up to their cocked positions and consequently, as explained above, securing weights 18 and 19 to shoes 8 and 9 so that their masses cooperatively respond to centrifugal force to oppose springs 16 and 17. Of course, it will be understood that if rotation were in the opposite direction, the surfaces 33 would have been engaged by member 35, and members 28 and 29 would have been cocked in the opposition direction; then their opposite upper edges would have been in position to engage flanges 26 and 27.

Thus, regardless of the direction of rotation, latch members 28 and 29 may be moved to a cocked position to engage flanges 26 and 27, and upon a return to a standstill members 28 and 29 will drop down to the position shown in solid outline for member 28 in FIGURE 4 so as to be disengaged.

Reviewing in summary the operation of the structure, for a relatively high speed operation coil 39 is left unenergized and as a result weights 18 and 19 have no effect on shoes 8 and 9. Because of this, the mass of shoes 8 and 9 which opposes springs 16 and 17 is less than it would otherwise be, and centrifugal force acting on the mass of the shoes 8 and 9 overcomes the spring force at a relatively high speed. If, however, a low speed is desired, coil 39 is energized. As a result, weights 18 and 19 are effectively connected to shoes 8 and 9 respectively so that their masses are acted on together by centrifugal force in opposition to springs 16 and 17. When this occurs, the addition of weights 18 and 19 to shoes 8 and 9 makes the centrifugal force opposing the springs act on a greater mass. Consequently, the slippage of the shoes which prevents further increase in the speed occurs at a lower speed than when shoes 8 and 9 are disconnected from weights 18 and 19.

Thus, in a very simple fashion, an effective multi-speed clutch is provided wherein the provision of more than one speed is readily achieved by varying the net amount of the mass which is acted on by centrifugal force in opposition to the spring force biasing the clutching means against the driving drum. Also, an effective latching means is economically provided.

While in according with the patent statutes I have described what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. A multi-speed clutch comprising:
    (a) a rotary input drum;
    (b) a rotary driven output member coaxial with said drum;
    (c) clutching means movably mounted on said driven member in driving relation thereto and having a clutching surface engageable with said drum;
    (d) spring means biasing said clutching means to a position wherein said surface engages said drum;
    (e) said clutching means being mounted on said driven member so that at least part of its mass is acted on by centrifugal force in opposition to said spring means when said driven member is rotated;
    (f) an auxiliary mass secured on said output member and movable outwardly in response to centrifugal force; and
    (g) latch means for connecting said auxiliary mass to said clutching means comprising a pair of pins extending from said auxiliary member substantially in a plane perpendicular to the axis of rotation of said drum, a latch member loosely secured on said pins, means biasing said latch member away from said clutching means to a position limited by said pins, said latch member having a center of gravity adjacent a line drawn between said pins when said latch member is in said position limited by both said pins, and means to move said latch member away from said position so that it is in interfering relationship with said clutching means thereby to connect said auxiliary mass to said clutching means for cooperative response to centrifugal force.

2. For use in order to vary the response to centrifugal force of a member rotatable about a central axis and biased inwardly toward that axis by springs; a weight rotatable about said axis and selectively connectable to said member; and a latch for connecting said weight to said member, said weight having a pair of pins extending therefrom substantilly in a plane perpendicular to the axis of rotation of said members, said latch having an opening formed therein with said pins extending therethrough so that said latch is loosely secured on said pins; means biasing said latch away from said member to a position limited by said pins, the center of gravity of said latch being adjacent a line drawn between said pins when said latch is in said position limited by both said pins, and means for striking said latch to move said latch about said pins away from said position to a second position, said weight being positioned so that said latch in its second position is in interfering relationship with said member so that said member and said weight respond together to centrifugal force as said member and said weight are rotated.

3. The structure defined in claim 2 wherein said axis is substantially vertical and said latch is biased by gravity to said position limited by both said pins.

4. The structure defined in claim 3 wherein said latch has a substantially V-shaped bottom portion depending below said pins, said latch being pivotable upwardly about one of said pins to a raised position when struck on one side of the bottom thereof and pivotable upwardly about the other of said pins to a raised position when struck on the other side of the bottom thereof.

5. A multi-speed clutch comprising:
 (a) a rotary input drum;
 (b) a rotary, driven, output member coaxial with said drum;
 (c) clutching means movably mounted on said driven members in driving relation thereto and having a clutching surface engageable with said drum;
 (d) spring means biasing said clutching means to a position wherein said surface engages said drum;
 (e) said clutching means being mounted on said driven member so that centrifugal force acts on the mass of said clutching means in opposition to said spring means when said driven member is rotated;
 (f) an auxiliary mass mounted on said driven member for movement in response to centrifugal force when said driven member is rotated, and
 (g) means for effecting an interfering relationship between said clutching means and said auxiliary mass so that said clutching means and said auxiliary mass move together in response to centrifugal force when said driven member is rotated, thereby varying the net amount of mass of said clutching means which is acted on by centrifugal force when said driven member is rotated.

6. A multi-speed clutch comprising:
 (a) a rotary input drum;
 (b) a rotary, driven, output member coaxial with and radially outward of said input drum;
 (c) a plurality of clutching members positioned radially of said input drum;
 (d) first spring means connecting said clutching members to each other to bias them toward said input drum;
 (e) said clutching members being slideably mounted on said driven member in driving relation thereto for movement radially outward in response to centrifugal force when said driven member is rotated;
 (f) a plurality of auxiliary masses positioned outside said input drum and biased toward said input drum by second spring means;
 (g) said auxiliary masses being slideably mounted on said driven member for movement radially outward in response to centrifugal force when said driven member is rotated;
 (h) means for effecting an interfering relationship between each of said clutching members and a corresponding one of said auxiliary masses so that each of said clutching members and a corresponding auxiliary mass move together in response to centrifugal force when said driven member is rotated, thereby varying the net amount of mass of each clutching member which is acted on by centrifugal force when said driven member is rotated.

References Cited by the Examiner
UNITED STATES PATENTS

| | | | |
|---|---|---|---|
| 1,764,317 | 6/30 | Kruse | 192—103 |
| 2,338,476 | 1/44 | Wittkop. | |
| 2,504,177 | 4/50 | Bruestle. | |
| 2,809,535 | 10/57 | Hein et al. | 192—114 |
| 2,869,698 | 1/59 | Conlee. | |
| 2,869,699 | 1/59 | Bochan. | |

DAVID J. WILLIAMOWSKY, *Primary Examiner.*